(12) United States Patent
Li

(10) Patent No.: US 8,558,963 B2
(45) Date of Patent: Oct. 15, 2013

(54) FIXED STRUCTURE FOR LIQUID CRYSTAL DISPLAY DEVICE AND LIQUID CRYSTAL DISPLAY DEVICE THEREOF

(75) Inventor: Quan Li, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 238 days.

(21) Appl. No.: 13/148,410

(22) PCT Filed: Jun. 10, 2011

(86) PCT No.: PCT/CN2011/075563
§ 371 (c)(1),
(2), (4) Date: Aug. 8, 2011

(87) PCT Pub. No.: WO2012/145956
PCT Pub. Date: Nov. 1, 2012

(65) Prior Publication Data
US 2013/0208208 A1     Aug. 15, 2013

(30) Foreign Application Priority Data

Apr. 26, 2011   (CN) .................... 2011 2 0126823 U

(51) Int. Cl.
*G02F 1/1333*   (2006.01)
*G02F 1/1335*   (2006.01)

(52) U.S. Cl.
USPC ............................................ 349/58; 349/64

(58) Field of Classification Search
USPC .................................................. 349/58–65
See application file for complete search history.

(56) References Cited

U.S. PATENT DOCUMENTS

| | | | |
|---|---|---|---|
| 2004/0008512 A1* | 1/2004 | Kim ............................ | 362/235 |
| 2005/0151894 A1* | 7/2005 | Katsuda et al. .............. | 349/58 |
| 2007/0085943 A1* | 4/2007 | Kang et al. .................. | 349/65 |
| 2007/0132905 A1* | 6/2007 | Kim et al. .................... | 349/58 |
| 2007/0171323 A1* | 7/2007 | Lin .............................. | 349/58 |
| 2007/0216825 A1* | 9/2007 | Hsu et al. .................... | 349/58 |
| 2008/0278656 A1* | 11/2008 | Yuan ............................ | 349/58 |

* cited by examiner

*Primary Examiner* — Bumsuk Won
*Assistant Examiner* — Charles Chang
(74) *Attorney, Agent, or Firm* — Xin (Kevin) He, Esq.; Troutman Sanders LLP

(57) ABSTRACT

The invention claims a fixed structure for the liquid crystal display device and a liquid crystal display device thereof. Said liquid crystal display device includes a liquid crystal panel and a backlight module. Said fixed structure includes a main-body rubber frame and a front frame fixed on the outer side of the main-body rubber frame. Said main-body rubber frame comprises a groove and a support chip. Said support chip supports the liquid crystal panel thereon. Said backlight module is arranged into the main-body rubber frame and lies below the support chip. Said front frame includes an edge frame and a fixed frame. Said edge frame comprises a first clamping part and a bulge matched with said groove. Said fixed frame comprises a second clamping part. Said first clamping part and said second clamping part as well as said support chip are used for clamping and fixing said liquid crystal panel. While assembling this invention, it only needs to insert the bulge of the edge frame for the front frame into the groove of the main-body rubber frame and then fix the fixed frame on the main-body rubber frame by screws; as a result, it simplifies the assembly process for the liquid crystal display module. Additionally, since the edge frame is made of plastic cement so that the weight of the liquid crystal display module is reduced.

18 Claims, 2 Drawing Sheets

FIXED STRUCTURE FOR LIQUID CRYSTAL DISPLAY DEVICE AND LIQUID CRYSTAL DISPLAY DEVICE THEREOF

BENEFIT CLAIMS

This application is a US National Stage of International Application No. PCT/CN2011/075563, filed Jun. 10, 2011, which claims the benefit of CN 201120126823.0 filed Apr. 26, 2011.

FIELD OF THE INVENTION

The invention relates to the technical filed of the liquid crystal display device, particularly to a fixed structure for the liquid crystal display device and the liquid crystal display device thereof.

BACKGROUND OF THE INVENTION

The traditional TFT-LCD (Thin Film Transistor Liquid Crystal Display) includes a backlight module, a liquid crystal panel, a rubber frame and a front frame. Said backlight module includes a metal back panel, a light guide plate, an optical membrane unit, a light source, etc. Said light guide plate is arranged into the metal back panel. Said light source is arranged on the metal back panel and lies on one side of the light guide plate. Said optical membrane unit is overlapped on the light guide plate. Said rubber frame is arranged on said metal back panel and encircles said metal back panel; said liquid crystal panel is arranged on said rubber frame; said front frame is assembled on said rubber frame and integrated with said rubber frame to clamp and fix the liquid crystal panel so as to protect the liquid crystal panel.

The front frame in present technology generally refers to the integrally-molded metal frame; as a result, more screws are needed to lock the metal front frame for the large-sized module; therefore, it will cost more working hours to process the assembling; additionally, the weight of the metal front frame is heavier, which is not beneficial for the lightweight design of the liquid crystal display device.

SUMMARY OF THE INVENTION

The main purpose of the invention is to provide a fixed structure for the liquid crystal display device and the liquid crystal display device thereof, which aims to reduce the weight of the liquid crystal display module and simplify the assembling process.

In order to achieve the above mentioned purpose, thus the invention discloses a fixed structure for the liquid crystal display device. Said liquid crystal display device includes a liquid crystal panel and a backlight module. Said fixed structure includes a main-body rubber frame and a front frame fixed on the outer side of the main-body rubber frame. Said main-body rubber frame comprises a groove and a support chip. Said support chip is used for supporting the liquid crystal panel thereon. Said backlight module is arranged into the main-body rubber frame and lies below the support chip. Said front frame comprises an edge frame and a fixed frame. Said edge frame comprises a first clamping part and a bulge matched with said groove. Said fixed frame comprises a fixed edge frame and two joint frames that are arranged on the two ends of the fixed edge frame and connect to the fixed edge frame vertically. Both said fixed edge frame and said joint frames internally form a second clamping part; said first clamping part and said second clamping part as well as said support chip are used for clamping and fixing said liquid crystal panel.

Preferably, said fixed frame is made of metal material. The fixed edge frame of said fixed frame is arranged on the outer side of the uncombined edge frame of the main-body rubber frame. Said joint frames are arranged on the outer side of said main-body rubber frame and are partly overlapped with one end part of the edge frame.

Preferably, said main-body rubber frame is opened with first locking holes. The two ends of said edge frame are opened with second locking holes. Said fixed edge frame is opened with third locking holes, and said joint frames are opened with fourth locking holes. Multiple screws penetrate through said third locking holes and said first locking holes to fix said fixed frame on the main-body rubber frame; multiple screws penetrate through said fourth locking holes, said second locking holes and said first locking holes to simultaneously fix said edge frame and said fixed frame on said main-body rubber frame.

Preferably, said main-body rubber frame is a square frame shape. Said groove is arranged on the outer side of said main-body rubber frame. Said support chip is arranged on the inner side of said main-body rubber frame and is internally protruded.

Preferably, said edge frame is arranged on the outer side of said main-body rubber frame in order to encircle the three sides of said main-body rubber frame; and the bulge of said edge frame is clamped into the groove of said main-body rubber frame.

Preferably, said edge frame is integrally molded by the plastic cement; and said edge frame is integrally П-shaped.

Preferably, said edge frame comprises a side wall. The upper end of said side wall is internally and vertically extended with said first clamping part. The middle part of said side wall is internally and vertically extended with said bulge.

Preferably, the surface of said support chip that lies above the light source is formed with a reflection layer. Said reflection layer is a surface layer formed by the method of two-color molding with the function of reflection or it is a reflection layer plated with metals.

The invention further discloses a fixed structure for the liquid crystal display device, wherein said liquid crystal display device includes a liquid crystal panel and a backlight module; said fixed structure includes a main-body rubber frame and a front frame fixed on the outer side of the main-body rubber frame. Said main-body rubber frame comprises a groove and a support chip. Said support chip is supports the liquid crystal panel thereon; said backlight module is arranged into the main-body rubber frame and lies below the support chip. Said front frame includes an edge frame and a fixed frame. Said edge frame comprises a first clamping part and a bulge matched with said groove. Said fixed frame includes a second clamping part; said first clamping part and said second clamping part as well as said support chip are used for clamping and fixing said liquid crystal panel.

Preferably, said main-body rubber frame is a square frame shape. Said groove is arranged on the outer side of said main-body rubber frame; said support chip is arranged on the inner side of said main-body rubber frame and is internally protruded.

Preferably, said edge frame is arranged on the outer side of said main-body rubber frame in order to encircle the three sides of said main-body rubber frame; and the bulge of said edge frame is clamped into the groove of said main-body rubber frame.

Preferably, said edge frame is integrally molded by the plastic cement; and said edge frame is integrally ∏-shaped Preferably, said edge frame comprises a side wall. The upper end of said side wall is internally and vertically extended with said first clamping part. The middle part of said side wall is internally and vertically extended with said bulge.

Preferably, the surface of said support chip that lies above the light source is formed with a reflection layer. Said reflection layer is a surface layer formed by the method of two-color molding with the function of reflection or it is a reflection layer plated with metals.

Preferably, said backlight module includes a back panel, a light guide plate, a light source and an optical membrane unit. Said back panel includes a bottom plate and a side wall. Said light guide plate is arranged on the bottom plate of the back panel. Said light source is arranged on the side wall of said back panel. Said optical membrane unit is arranged above the light guide plate.

Preferably, said light source lies on the opposite two sides of said light guide plate.

Preferably, said backlight module includes a back panel, a diffusion plate and a light source; said back panel includes a bottom plate and a side wall. Said light source is arranged on the bottom plate of said back panel, and said diffusion plate is arranged on the top part of the side wall of said back panel.

The invention further discloses a liquid crystal display device, wherein said liquid crystal display device includes a fixed structure, a liquid crystal panel and a backlight module. Said liquid crystal panel is clamped into said fixed structure. Said backlight module is arranged into said fixed structure and lies below said liquid crystal panel. Said fixed structure includes a main-body rubber frame and a front frame fixed on the outer side of the main-body rubber frame. Said main-body rubber frame comprises a groove and a support chip. Said support chip supports the liquid crystal panel thereon. Said backlight module is arranged into said main-body rubber frame and lies below the support chip. Said front frame includes an edge frame and a fixed frame. Said edge frame comprises a first clamping part and a bulge matched with said groove. Said fixed frame includes a second clamping part. Said first clamping part and said second clamping part as well as said support chip are used for clamping and fixing said liquid crystal panel.

Preferably, said backlight module includes a back panel, a light guide plate, a light source and an optical membrane unit. Said back panel includes a bottom plate and a side wall; said light guide plate is arranged on the bottom plate of the back panel. Said light source is arranged on the side wall of said back panel. Said optical membrane unit is arranged above the light guide plate.

Preferably, said backlight module includes a back panel, a diffusion plate and a light source; said back panel includes a bottom plate and a side wall. Said light source is arranged on the bottom plate of said back panel, and said diffusion plate is arranged on the top part of the side wall of said back panel.

The invention claims a fixed structure for the liquid crystal display device and a liquid crystal display device thereof, which takes threes ones out of the four edges of the front frame to integrally mold into the edge frame of the front frame by the plastic cement. The fourth edge is the fixed frame which is made of metal material; meanwhile, the inner side of the edge frame comprises a bulge; the external side of the main-body rubber frame comprises a groove correspondingly matched with the bulge. In the process of assembling, the bulge in the edge frame is inserted into the groove of the main-body rubber frame, and the fixed frame is fixed on the main-body rubber frame by screws; as a result, the invention simplifies the assembling process for the liquid crystal display module. Additionally, since the edge frame is made of plastic cement so that the weight of the liquid crystal display module is reduced and the cost is saved as well.

DESCRIPTION OF ATTACHED DRAWINGS

The purpose implementation, the function features and advantages of the invention will be further illustrated by integrating the exemplary embodiments and taking the attached drawings as references.

DETAILED DESCRIPTION OF THE EMBODIMENTS

The technical method for realizing the purpose of the invention will be exactly illustrated according to the attached drawings and the exemplary embodiments. It should be understood that the described detailed exemplary embodiment is only used for illustrating this invention rather than limiting.

Figure 1:
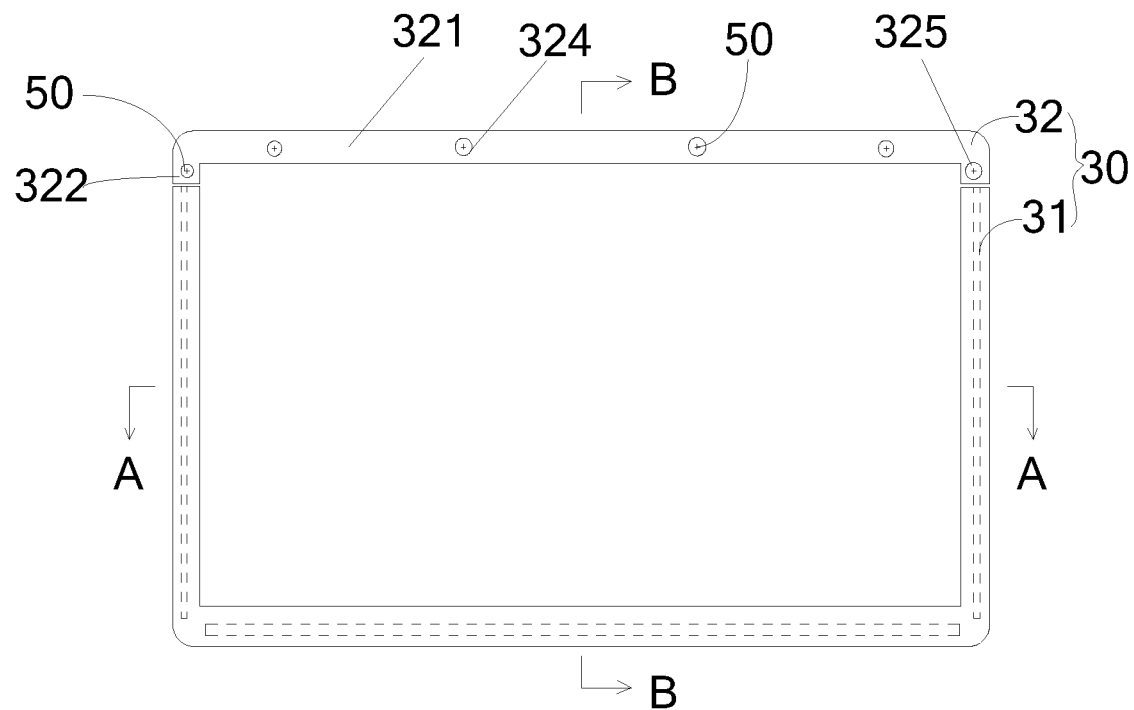
FIG. 1 is the front view for the first exemplary embodiment of the liquid display device in the invention.
Figure 2:
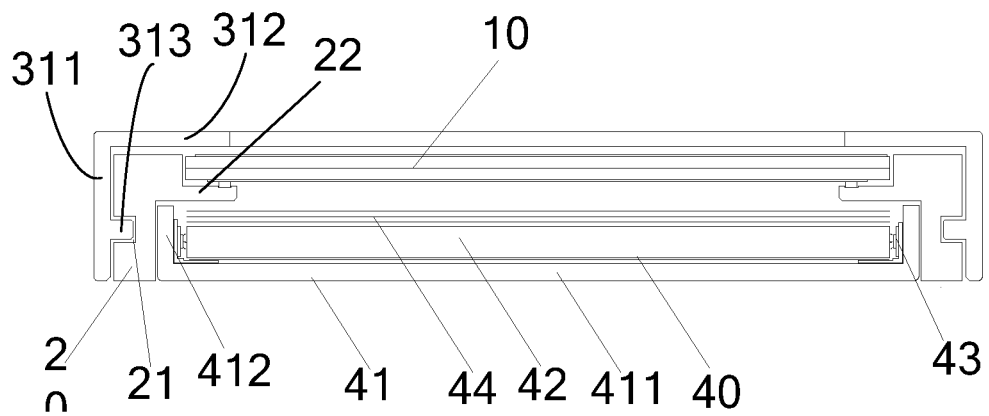
FIG. 2 is the cutaway view in A-A direction illustrated in FIG. 1.
Figure 3:
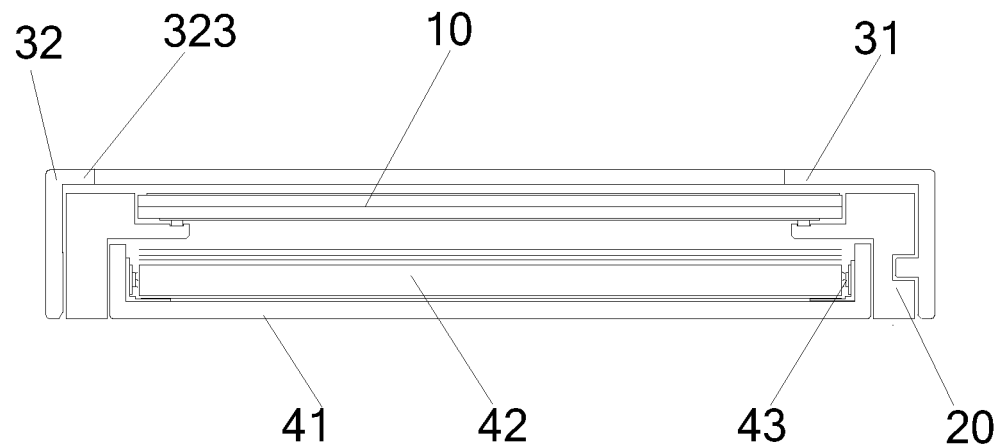
FIG. 3 is the cutaway view in B-B direction illustrated in FIG. 1.

Please take the FIG. 1, FIG. 2 and FIG. 3 as references, wherein FIG. 1 is the front view for the first exemplary embodiment of the liquid display device in the invention; FIG. 2 is the cutaway view in A-A direction illustrated in FIG. 1; and FIG. 3 is the cutaway view in B-B direction illustrated in FIG. 1.

In this exemplary embodiment, said liquid crystal display device includes a liquid crystal panel 10, a main-body rubber frame 20, a front frame 30 and a backlight module 40. In this exemplary embodiment, said backlight module 40 is a side-light type backlight module, which includes a back panel 41, a light guide plate 42, a light source 43 and an optical membrane unit 44; said back panel 41 includes a bottom plate 411 and a side wall 412; said light guide plate 42 is arranged on the bottom plate 411 of the back panel 41; and said light source 43 is arranged on the side wall 412 of said back panel 40, moreover, said light source 43 lies on the opposite two sides of said light guide plate 42. Certainly, in this exemplary embodiment, said light source 43 is arranged on the opposite two sides of the light guide plate 42; and in other exemplary embodiments, said light source 43 can only be arranged on one side or three sides or four sides of the light guide plate 42.

Said main-body rubber frame 20 is a square-frame shape; one side of said main-body rubber frame 20 is opened with a first locking hole (not shown in the FIGS); the outer side of said main-body rubber frame 20 is slotted with a groove 21, and the inner side of said main-body rubber frame 20 is internally protruded with a support chip 22. Said support chip 22 of the main-body rubber frame 20 supports the liquid crystal panel 10 thereon; moreover, said liquid crystal panel 10 lies into said main-body rubber frame 20.

Said backlight module 40 is arranged into said main-body rubber frame 20 and lies below said support chip 22. Preferably, the surface of said support chip 22 that lies above the light source 43 is formed with a reflection layer (not shown in the FIGS); said reflection layer is a surface layer formed by the method of two-color molding with the function of reflection or it is a reflection layer plated with metals. The light emitted from the light source 43 is firstly reflected by said reflection layer and then enters the light guide plate 42 so as to improve the utilization ratio for the light.

Said front frame 30 includes an edge frame 31 and a fixed frame 32; said edge frame 31 is integrally molded by the plastic cement; such edge frame 31 is integrally Π-shaped two ends of said edge frame 31 are opened with a second locking hole (not shown in the FIGS). Said edge frame 31 comprises a side wall 311, and the upper end of said side wall 311 is internally and vertically extended with a first clamping part 312; moreover, the middle part of said side wall 311 is internally and vertically extended with a bulge 313 so that it enables the cross section of the edge frame 31 to present an F shape.

Said fixed frame 32 is made of metal material; said fixed frame 32 comprises a fixed frame 321 and two joint frames 322 that are arranged on two ends of the fixed frame 321 and is vertical to the fixed edge 321; both said fixed frame 321 and said joint frame 322 are formed with a second clamping 323; said fixed frame 321 is opened with a third locking hole 324; and said joint frame 322 is opened with a fourth locking hole 325.

Said edge frame 31 is arranged outside of said main-body rubber frame 20 encircling the three sides of said main-body rubber frame 20; moreover, the bulge 313 of said edge frame 31 is clamped into the groove 21 of said main-body rubber frame 20; said first clamping part 312 lies on said support chip 22. The fixed edge frame 321 of said fixed frame 32 is arranged on the external side of the uncombined edge frame 31 of the main-body rubber frame 20; said joint frame 322 is arranged on the outer side of said main-body rubber frame 20 and is partly overlapped with one end part of the edge frame 31. Multiple screws 50 penetrate through said third locking hole 324 of the fixed frame 32 and said first locking hole of the main-body rubber frame 20 to fix said fixed frame 32 on the main-body rubber frame 20; moreover, multiple screws 50 penetrate through said fourth locking hole 325 of the fixed frame 32, said second locking hole of the edge frame 31 and said first locking hole of the main-body rubber frame 20 in order to simultaneously fix said edge frame 31 and said fixed frame 32 on said main-body rubber frame 20. Said liquid crystal panel 10 is clamped and fixed between the support chip 22 of the main-body rubber frame 20 and the first clamping part 312 of the edge frame 31 as well as the second clamping part 323 of the fixed frame 32.

Therein, said front frame 30 and said main-body rubber frame 20 in the liquid crystal display device for fixing the liquid crystal panel 10 constitute the fixed structure for the liquid crystal display device of this invention.

In this exemplary embodiment, the edge frame 31 of the front frame 30 is integrally molded by the plastic cement materials, and the fixed frame 32 is made of metal materials; meanwhile, the inner side of the edge frame 31 comprises the bulge 313, and the external side of the main-body rubber frame 20 comprises the groove 21 that is correspondingly matched with the bulge 313. In the process of assembling, the bulge 313 of the edge frame is inserted into the groove 21 of the main-body rubber frame 20, and then the fixed frame 32 is fixed on the main-body rubber frame 20 by screws 50; as a result, assembling process for the liquid crystal display module is simplified. Additionally, since the edge frame 31 is made of plastic cement so that the weight of the liquid crystal display module is reduced.

Figure 4:
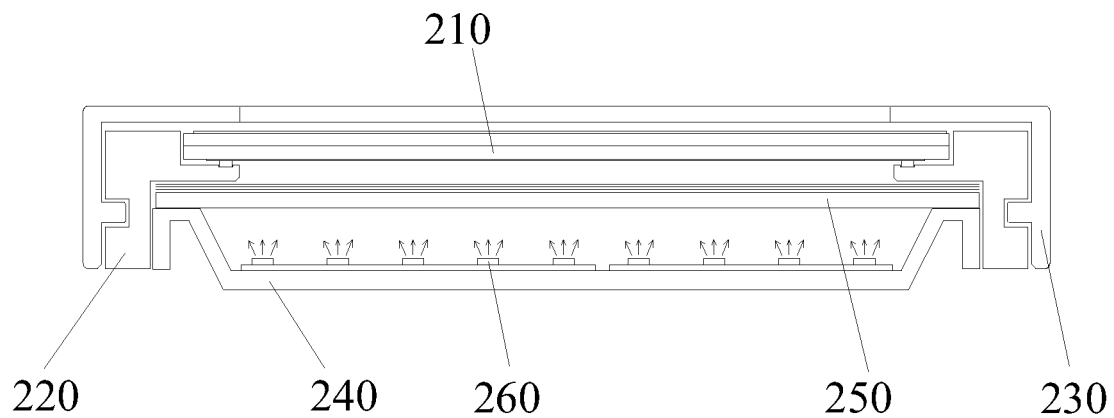
FIG. 4 is the cutaway view for the second exemplary embodiment of the liquid display device in the invention.

As is shown in FIG. 4, the liquid crystal display device proposed by the second exemplary embodiment is similar with that of said first exemplary embodiment, which includes a liquid panel 210, a main-body rubber frame 220, a front frame 230 and a backlight module; the difference between this exemplary embodiment and the first exemplary embodiment lies in that the backlight module in this exemplary embodiment is a direct-light type backlight module), which includes a back panel 240, a diffusion plate 250 and a light source 260; said back panel 240 includes a bottom plate and a side wall (not shown in the FIGS); said light source 260 is arranged on the bottom plate of the back panel 240; said diffusion plate 250 is arranged on the top part of the side wall of the back panel 240.

What is illustrated above is just a preferable exemplary embodiment, which will not limit the patent scope of the invention. Any equivalent replacements made by the specifications and drawings of the invention, which are directly or indirectly applied to other technical fields, should be included into the protection scope of the invention.

What is claimed is:

1. A fixed structure for the liquid crystal display device, wherein said liquid crystal display device comprises a liquid crystal panel and a backlight module; said fixed structure comprises a main-body rubber frame and a front frame fixed on the outer side of the main-body rubber frame; said main-body rubber frame comprises a groove and a support chip; said support chip supports the liquid crystal panel thereon; said backlight module is arranged into the main-body rubber frame and lies below the support chip; said front frame comprises an edge frame and a fixed frame; said edge frame comprises a first clamping part and a bulge matched with said groove; said fixed frame comprises a fixed edge frame and two joint frames that are arranged on the two ends of the fixed edge frame and are vertical to the fixed edge frame; both said fixed edge frame and said joint frame internally form a second clamping part; said first clamping part and said second clamping part as well as said support chip are used for clamping and fixing said liquid crystal panel;

said fixed frame is made of metal material; the fixed edge frame of said fixed frame is arranged on the outer side of the uncombined edge frame of the main-body rubber frame; said joint frame is arranged on the outer side of said main-body rubber frame and is partly overlapped with one end part of the edge frame;

said main-body rubber frame is opened with first locking holes; the two ends of said edge frame are opened with second locking holes; said fixed edge frame is opened with third locking holes, and said joint frames are opened with fourth locking holes; multiple screws penetrate through said third locking holes and said first locking holes to fix said fixed frame on the main-body rubber frame; moreover, multiple screws penetrate through said fourth locking holes, said second locking holes and said first locking holes to simultaneously fix said edge frame and said fixed frame on said main-body rubber frame.

2. The fixed structure according to claim 1, wherein said main-body rubber frame is a square frame shape; said groove is arranged on the outer side of said main-body rubber frame; said support chip is arranged on the inner side of said main-body rubber frame and is internally protruded.

3. The fixed structure according to claim 1, wherein said edge frame is arranged on the outer side of said main-body rubber frame in order to encircle the three sides of said main-body rubber frame; and the bulge of said edge frame is clamped into the groove of said main-body rubber frame.

4. The fixed structure according to claim 1, wherein said edge frame is integrally molded by the plastic cement; and such edge frame is integrally n-shaped.

5. The fixed structure according to claim 4, wherein said edge frame comprises a side wall; the upper end of said side wall is internally and vertically extended with said first clamping part; the middle part of said side wall is internally and vertically extended with said bulge.

6. The fixed structure according to claim 4, wherein the surface of said support chip that lies above the light source is formed with a reflection layer; said reflection layer is a surface layer formed by the method of two-color molding with the function of reflection or it is a reflection layer plated with metals.

7. A fixed structure for the liquid crystal display device, wherein said liquid crystal display device comprises a liquid crystal panel and a backlight module; said fixed structure comprises a main-body rubber frame and a front frame fixed on the outer side of the main-body rubber frame; said main-body rubber frame comprises a groove and a support chip; said support chip supports the liquid crystal panel thereon; said backlight module is arranged into the main-body rubber frame and lies below the support chip; said front frame comprises an edge frame and a fixed frame; said edge frame comprises a first clamping part and a bulge matched with said groove; said fixed frame comprises a second clamping part; said first clamping part and said second clamping part as well as said support chip are used for clamping and fixing said liquid crystal panel;
  said fixed frame further comprises a fixed edge frame and two joint frames that are arranged on the two ends of the fixed edge frame and are vertical to the fixed edge frame, both said fixed edge frame and said joint frame internally form the second clamping part;
  said main-body rubber frame is opened with first locking holes; the two ends of said edge frame are opened with second locking holes; said fixed edge frame is opened with third locking holes, and said joint frames are opened with fourth locking holes; multiple screws penetrate through said third locking holes and said first locking holes to fix said fixed frame on the main-body rubber frame; moreover, multiple screws penetrate through said fourth locking holes, said second locking holes and said first locking holes to simultaneously fix said edge frame and said fixed frame on said main-body rubber frame.

8. The fixed structure according to claim 7, wherein said main-body rubber frame is a square frame shape; said groove is arranged on the outer side of said main-body rubber frame; said support chip is arranged on the inner side of said main-body rubber frame and is internally protruded.

9. The fixed structure according to claim 7, wherein said edge frame is arranged on the outer side of said main-body rubber frame in order to encircle the three sides of said main-body rubber frame; and the bulge of said edge frame is clamped into the groove of said main-body rubber frame.

10. The fixed structure according to claim 7, wherein said edge frame is integrally molded by the plastic cement; and such edge frame is integrally n-shaped.

11. The fixed structure according to claim 10, wherein said edge frame comprises a side wall; the upper end of said side wall is internally and vertically extended with said first clamping part; the middle part of said side wall is internally and vertically extended with said bulge.

12. The fixed structure according to claim 7, wherein the surface of said support chip that lies above the light source is formed with a reflection layer; said reflection layer is a surface layer formed by the method of two-color molding with the function of reflection or it is a reflection layer plated with metals.

13. The fixed structure according to claim 7, wherein said backlight module comprises a back panel, a light guide plate, a light source and an optical membrane unit; said back panel comprises a bottom plate and a side wall; said light guide plate is arranged on the bottom plate of the back panel; said light source is arranged on the side wall of said back panel; said optical membrane unit is arranged above the light guide plate.

14. The fixed structure according to claim 13, wherein said light source lies on the opposite two sides of said light guide plate.

15. The fixed structure according to claim 7, wherein said backlight module comprises a back panel, a diffusion plate and a light source; said back panel comprises a bottom plate and a side wall; said light source is arranged on the bottom plate of said back panel; and said diffusion plate is arranged on the top part of the side wall of said back panel.

16. A liquid crystal display device, wherein said liquid crystal display device comprises a fixed structure, a liquid crystal panel and a backlight module; said liquid crystal panel is clamped into said fixed structure; said backlight module is arranged into said fixed structure and lies below said liquid crystal panel; said fixed structure comprises a main-body rubber frame and a front frame fixed on the outer side of the main-body rubber frame; said main-body rubber frame comprises a groove and a support chip; said support chip supports the liquid crystal panel thereon; said backlight module is arranged into said main-body rubber frame and lies below the support chip; said front frame comprises an edge frame and a fixed frame; said edge frame comprises a first clamping part and a bulge matched with said groove; said fixed frame comprises a second clamping part; said first clamping part and said second clamping part as well as said support chip are used for clamping and fixing said liquid crystal panel;
  said fixed frame further comprises a fixed edge frame and two joint frames that are arranged on the two ends of the fixed edge frame and are vertical to the fixed edge frame, both said fixed edge frame and said joint frame internally form the second clamping part;
  said main-body rubber frame is opened with first locking holes; said main-body rubber frame is opened with first locking holes; the two ends of said edge frame are opened with second locking holes; said fixed edge frame is opened with third locking holes, and said joint frames are opened with fourth locking holes; multiple screws penetrate through said third locking holes and said first locking holes to fix said fixed frame on the main-body rubber frame; moreover, multiple screws penetrate through said fourth locking holes, said second locking holes and said first locking holes to simultaneously fix said edge frame and said fixed frame on said main-body rubber frame.

17. The liquid crystal display device according to claim 16, wherein said backlight module comprises a back panel, a light guide plate, a light source and an optical membrane unit; said back panel comprises a bottom plate and a side wall; said light guide plate is arranged on the bottom plat of the back panel; said light source is arranged on the side wall of said back panel; said optical membrane unit is arranged above the light guide plate.

18. The fixed structure according to claim 16, wherein said backlight module comprises a back panel, a diffusion plate and a light source; said back panel comprises a bottom plate and a side wall; said light source is arranged on the bottom plate of said back panel; and said diffusion plate is arranged on the top part of the side wall of said back panel.

* * * * *